United States Patent
Kuki

(10) Patent No.: US 10,562,019 B2
(45) Date of Patent: Feb. 18, 2020

(54) HONEYCOMB STRUCTURE

(71) Applicant: NGK INSULATORS, LTD., Nagoya (JP)

(72) Inventor: Tatsuyuki Kuki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 41 days.

(21) Appl. No.: 15/447,787

(22) Filed: Mar. 2, 2017

(65) Prior Publication Data

US 2017/0252737 A1    Sep. 7, 2017

(30) Foreign Application Priority Data

Mar. 7, 2016  (JP) ................................. 2016-043607

(51) Int. Cl.
*B01J 21/04*     (2006.01)
*B01J 23/02*     (2006.01)
(Continued)

(52) U.S. Cl.
CPC ............ *B01J 35/04* (2013.01); *B01D 46/247* (2013.01); *B01D 46/2429* (2013.01); *B01D 46/2455* (2013.01); *B01D 46/2462* (2013.01); *B01D 46/2474* (2013.01); *B01D 53/94* (2013.01); *B01J 27/224* (2013.01); *B28B 1/24* (2013.01);
(Continued)

(58) Field of Classification Search
None
See application file for complete search history.

(56) References Cited

U.S. PATENT DOCUMENTS 7,691,466 B2    4/2010 Ogura et al.
2006/0210764 A1    9/2006 Yamada et al.
(Continued)

FOREIGN PATENT DOCUMENTS

CN    101585003 A    11/2009
CN    102160945 A     8/2011
(Continued)

OTHER PUBLICATIONS

Japanese Offer of Information Form, Japanese Application No. 2016-043607, dated Feb. 5, 2019 (1 page).
(Continued)

*Primary Examiner* — Haytham Soliman
(74) *Attorney, Agent, or Firm* — Burr & Brown, PLLC

(57) ABSTRACT

The honeycomb structure includes a pillar-shaped honeycomb structure body, and a circumferential coating layer disposed to surround a circumference of the honeycomb structure body, and cells which are formed at an outermost circumference of the honeycomb structure body and in which peripheries of the cells are defined by the partition walls without any lacks are defined as outermost circumference complete cells, and in a cross section of the honeycomb structure body which is perpendicular to an extending direction of the cells a minimum distance T (mm) among distances from the outermost circumference complete cells to the surface of the circumferential coating layer and a porosity P (%) of the circumferential coating layer satisfy relations of Equation (1) and Equation (2) as follows:

$1.5 \geq T \geq 16 \times (100-P)^{-1.4}$; and     Equation (1):

$20 \leq P \leq 75$     Equation (2).

12 Claims, 6 Drawing Sheets

(51) Int. Cl.
    *B01J 35/04* (2006.01)
    *B01D 46/24* (2006.01)
    *B01D 53/94* (2006.01)
    *B01J 27/224* (2006.01)
    *B28B 1/24* (2006.01)
    *B28B 3/02* (2006.01)
    *B28B 3/20* (2006.01)
    *B28B 11/04* (2006.01)
    *B28B 11/12* (2006.01)
    *B28B 11/24* (2006.01)
    *B28C 3/00* (2006.01)
    *F01N 3/28* (2006.01)

(52) U.S. Cl.
    CPC ............. *B28B 3/02* (2013.01); *B28B 3/20* (2013.01); *B28B 11/045* (2013.01); *B28B 11/12* (2013.01); *B28B 11/241* (2013.01); *B28B 11/243* (2013.01); *B28C 3/00* (2013.01); *F01N 3/2842* (2013.01); *B01D 2046/2433* (2013.01); *B01D 2046/2437* (2013.01); *B01D 2046/2488* (2013.01)

(56) References Cited

U.S. PATENT DOCUMENTS

| | | |
|---|---|---|
| 2007/0009707 A1 | 1/2007 | Ogura et al. |
| 2009/0022942 A1 | 1/2009 | Hiramatsu et al. |
| 2009/0291825 A1 | 11/2009 | Ohno et al. |
| 2010/0151187 A1 | 6/2010 | Ogura et al. |
| 2011/0198772 A1 | 8/2011 | Watanabe |
| 2012/0148792 A1* | 6/2012 | Okazaki ............ C04B 35/195 428/116 |
| 2015/0014292 A1* | 1/2015 | Sakuma ............ F01N 9/00 219/162 |
| 2015/0086748 A1 | 3/2015 | Kato et al. |

FOREIGN PATENT DOCUMENTS

| | | |
|---|---|---|
| CN | 204200312 U | 3/2015 |
| JP | 2006-255542 A | 9/2006 |
| JP | 2007-014886 A1 | 1/2007 |
| JP | 2010-001205 A | 1/2010 |
| JP | 2012-206080 A | 10/2012 |
| WO | 2007/091688 A1 | 8/2007 |

OTHER PUBLICATIONS

Chinese Office Action (Application No. 201710131307.9) dated May 7, 2019.

Japanese Office Action (with English translation), Japanese Application No. 2016-043607, dated Jun. 18, 2019 (6 pages).

\* cited by examiner

HONEYCOMB STRUCTURE

The present application is an application based on JP-2016-043607 filed on Mar. 7, 2016 with Japan Patent Office, the entire contents of which are incorporated herein by reference.

BACKGROUND OF THE INVENTION

Field of the Invention

The present invention relates to a honeycomb structure, and more particularly, it relates to a honeycomb structure in which it is possible to decrease a thickness of a circumferential coating layer but it is possible that the circumferential coating layer is hard to be damaged.

Description of the Related Art

In recent years, consciousness for environmental problems has increased in the community as a whole, and in a technical field in which fuel is burnt to generate power, various technologies have been developed to remove toxic components such as nitrogen oxides from an exhaust gas generated during the burning of the fuel.

Heretofore, for a purifying treatment of toxic substances such as HC, CO and $NO_x$ contained in the exhaust gas emitted from a car engine or the like, a honeycomb structure onto which a catalyst is loaded has been used. Furthermore, the honeycomb structure, in which open ends of cells defined by porous partition walls are plugged, has also been used as an exhaust gas purifying filter.

The honeycomb structure is a pillar-shaped structure having partition walls defining a plurality of cells which become through channels for the exhaust gas. Such a honeycomb structure includes, in its circumferential portion, a circumferential wall which covers the pillar-shaped structure. As the circumferential wall of the honeycomb structure, there are, for example, roughly two types of circumferential walls as follows.

The first type of circumferential wall is a circumferential wall formed integrally with the partition walls when forming the partition walls. As described above, the circumferential wall formed integrally with the partition walls is usually often referred to as the circumferential wall. The second type of circumferential wall is a circumferential wall formed by coating a circumferential portion of the honeycomb structure with a coating material or the like, and drying the applied coating material, followed by firing when necessary. This circumferential wall is usually often referred to as a circumferential coating layer. For example, there is disclosed a honeycomb structure including a honeycomb segment bonded body in which bonding surfaces of a plurality of honeycomb segments are integrally bonded to one another via a bonding layer, and the circumferential coating layer which coats a circumferential surface of the honeycomb segment bonded body (e.g., see Patent Document 1).

[Patent Document 1] JP-A-2007-14886

SUMMARY OF THE INVENTION

In a honeycomb structure including a circumferential coating layer, there has been the problem that when treating the honeycomb structure, the circumferential coating layer chips to be damaged or such a hole that passes through the circumferential coating layer is opened. To solve this problem, in the honeycomb structure for use as a catalyst carrier or a filter, the circumferential coating layer is required to have a certain degree of thickness. Furthermore, when a catalyst is loaded onto partition walls of the honeycomb structure, the circumferential coating layer might thickly be formed also for the purpose of inhibiting the catalyst from permeating the circumferential coating layer to ooze outside.

On the other hand, the circumferential coating layer is formed mainly for convenience in treating the honeycomb structure, it is originally preferable that the circumferential coating layer is adjusted to be thin as much as possible, and formation of a thin wall of the circumferential coating layer is also studied. However, heretofore, a specific measurement method has not been determined as to the thickness of the circumferential coating layer, and the thickness of the circumferential coating layer has approximately been stipulated by a method of measuring a thickness of the thinnest region of the circumferential coating layer or a thickness of the thickest region of the circumferential coating layer.

However, in a case where of determining the thickness of the circumferential coating layer by a heretofore known method, honeycomb structures which are damaged and honeycomb structures which are not damaged are present even among the honeycomb structures including the circumferential coating layers having the same thickness, and it has been difficult to decrease the thickness of the circumferential coating layer. That is, in the conventional honeycomb structure, it is difficult to achieve compatibility between the inhibition of damages on the circumferential coating layer and the formation of the thin wall, importance is placed onto the inhibition of the damages on the circumferential coating layer, and hence the thickness of the circumferential coating layer has to be comparatively thickly formed. In consequence, there has earnestly been desired development of a honeycomb structure in which it is possible to decrease a thickness of a circumferential coating layer but it is possible that the circumferential coating layer is hard to be damaged and in which it is possible to effectively inhibit a catalyst from oozing out from the circumferential coating layer when loading the catalyst onto partition walls.

The present invention has been developed in view of these problems of the conventional technology. An object of the present invention is to provide a honeycomb structure in which it is possible to decrease a thickness of a circumferential coating layer but it is possible that the circumferential coating layer is hard to be damaged.

According to the present invention, a honeycomb structure is provided as follows.

According to a first aspect of the present invention, a honeycomb structure is provided including a pillar-shaped honeycomb structure body having porous partition walls defining a plurality of cells extending from an inflow end face to an outflow end face to become through channels for fluid, and a circumferential coating layer disposed to surround a circumference of the honeycomb structure body, wherein the cells which are formed at an outermost circumference of the honeycomb structure body and in which peripheries of the cells are defined by the partition walls without any lacks and the circumferential coating layer does not penetrate inner portions of the cells are defined as outermost circumference complete cells, and in a cross section of the honeycomb structure body which is perpendicular to an extending direction of the cells, a minimum distance T (mm) among distances from the outermost circumference complete cells to the surface of the circumferential coating layer and a porosity P (%) of the circumferential coating layer satisfy relations of Equation (1) and Equation (2) as follows:

$$1.5 \geq T \geq 16 \times (100-P)^{-1.4}; \text{ and} \qquad \text{Equation (1):}$$

$$20 \leq P \leq 75. \qquad \text{Equation (2):}$$

According to a second aspect of the present invention, the honeycomb structure according to the above first aspect is provided, wherein the minimum distance T (mm) among the distances from the outermost circumference complete cells to the surface of the circumferential coating layer further satisfies a relation of Equation (3) as follows:

$$T \geq 0.03. \qquad \text{Equation (3):}$$

According to a third aspect of the present invention, the honeycomb structure according to the above first or second aspects is provided, wherein in a cross section of the circumferential coating layer, a total area Sp ($\mu m^2$) of pores formed in the circumferential coating layer and a total peripheral length Lp ($\mu m$) of the pores formed in the circumferential coating layer further satisfy a relation of Equation (4) as follows:

$$4 \times Sp/Lp \leq 45. \qquad \text{Equation (4):}$$

According to a fourth aspect of the present invention, the honeycomb structure according to any one of the above first to third aspects is provided, wherein a material of the circumferential coating layer includes at least one selected from a first material group consisting of silicon carbide, cordierite, a silicon-silicon carbide based composite material, silicon nitride, mullite, alumina, a silicon carbide-cordierite based composite material, and aluminum titanate.

According to a fifth aspect of the present invention, the honeycomb structure according to the above fourth aspect is provided, wherein the material of the circumferential coating layer contains 20 mass % or more of at least one selected from the first material group.

According to a sixth aspect of the present invention, the honeycomb structure according to any one of the above first to fifth aspects is provided, wherein a material of the honeycomb structure body includes at least one selected from a second material group consisting of silicon carbide, cordierite, a silicon-silicon carbide based composite material, silicon nitride, mullite, alumina, a silicon carbide-cordierite based composite material, and aluminum titanate.

According to a seventh aspect of the present invention, the honeycomb structure according to the above sixth aspect is provided, wherein the material of the honeycomb structure body contains 30 mass % or more of at least one selected from the second material group.

According to and eighth aspect of the present invention, the honeycomb structure according to any one of the above first to seventh aspects is provided, further including plugging portions disposed in an end portion on the inflow end face side of a part of the cells formed in the honeycomb structure body and an end portion on the outflow end face side of residual cells among the cells.

According to a ninth aspect of the present invention, the honeycomb structure according to any one of the above first to eighth aspects is provided, wherein a thickness of the partition walls is from 0.05 to 0.5 mm.

According to a tenth aspect of the present invention, the honeycomb structure according to any one of the above first to ninth aspects is provided, wherein a porosity of the partition walls is from 20 to 75%.

According to an eleventh aspect of the present invention, the honeycomb structure according to any one of the above first to tenth aspects is provided, wherein a cell density of the honeycomb structure body is from 15 to 200 cells/$cm^2$.

According to a twelfth aspect of the present invention, the honeycomb structure according to any one of the above first to eleventh aspects is provided, wherein the honeycomb structure body has a circumferential wall disposed to surround the partition walls.

According to a thirteenth aspect of the present invention, the honeycomb structure according to any one of the above first to twelfth aspects is provided, wherein in the minimum distance T (mm) among the distances from the outermost circumference complete cells to the surface of the circumferential coating layer, a thickness t2 (mm) in a range where the circumferential coating layer is disposed is from 0.025 to 1.0 mm.

The honeycomb structure of the present invention includes a pillar-shaped honeycomb structure body and a circumferential coating layer, and is characterized by satisfying relations of Equation (1) and Equation (2) which are described above. In the honeycomb structure having such a constitution, it is possible to decrease a thickness of the circumferential coating layer but it is possible that the circumferential coating layer is hard to be damaged.

Especially in the present invention, a minimum distance T (mm) among distances from outermost circumference complete cells in which the circumferential coating layer does not penetrate inner portions of the cells to the surface of the circumferential coating layer is represented by Equation (1) described above. This "minimum distance T (mm)" is a remarkably effective value when specifying that the circumferential coating layer of the honeycomb structure is hard to be damaged. Furthermore, by this "minimum distance T (mm)", it is possible to specify a damage limit value of the circumferential coating layer in a correlation between this minimum distance T (mm) and "a porosity P (%)" of the circumferential coating layer. Here, the damage limit value of the circumferential coating layer is a critical value indicating that there remarkably increase frequencies at which the circumferential coating layer is damaged. When "the minimum distance T (mm)" is this damage limit value of "$16 \times (100-P)^{-1.4}$" or more, it is possible to effectively inhibit damages on the circumferential coating layer.

DESCRIPTION OF THE PREFERRED EMBODIMENTS

Figure 1:
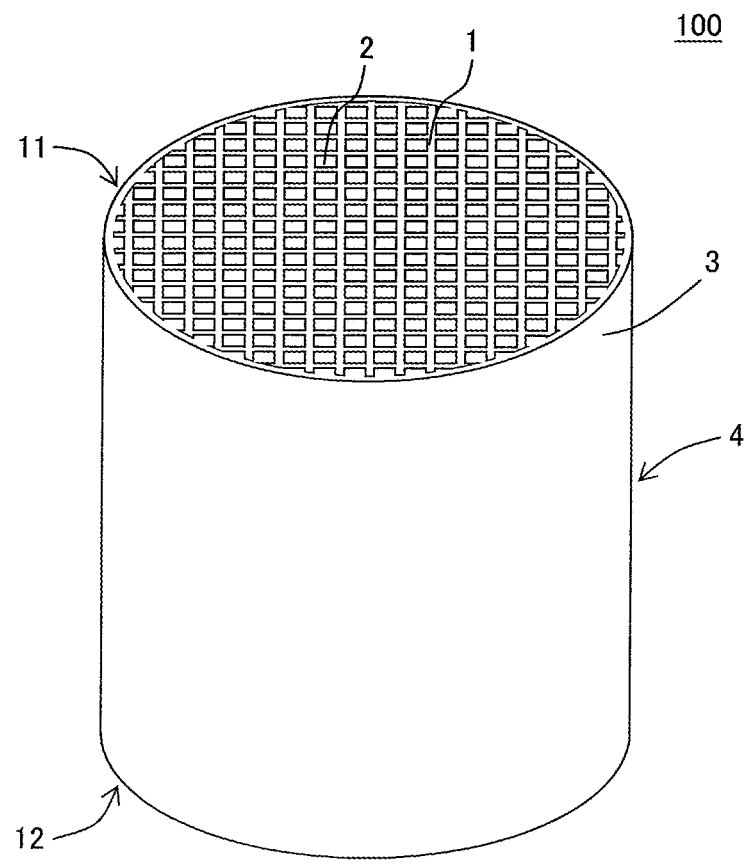
FIG. 1 is a perspective view schematically showing one embodiment of a honeycomb structure of the present invention.

Hereinafter, embodiments of the present invention will be described. However, the present invention is not limited to the following embodiments. Therefore, it should be understood that changes, improvements and the like can suitably be added to the following embodiments on the basis of ordinary knowledge of a person skilled in the art without departing from the gist of the present invention.

(1) Honeycomb Structure:

As shown in FIG. 1 to FIG. 5, one embodiment of a honeycomb structure of the present invention is a honeycomb structure 100 including a honeycomb structure body 4 having porous partition walls 1 and a circumferential coating layer 3 disposed to surround a circumference of the honeycomb structure body 4. The porous partition walls 1 define a plurality of cells 2 extending from an inflow end face 11 to an outflow end face 12 to become through channels for fluid. The honeycomb structure body 4 possesses a pillar shape having the inflow end face 11 and the outflow end face 12 as both end faces.

Figure 2:
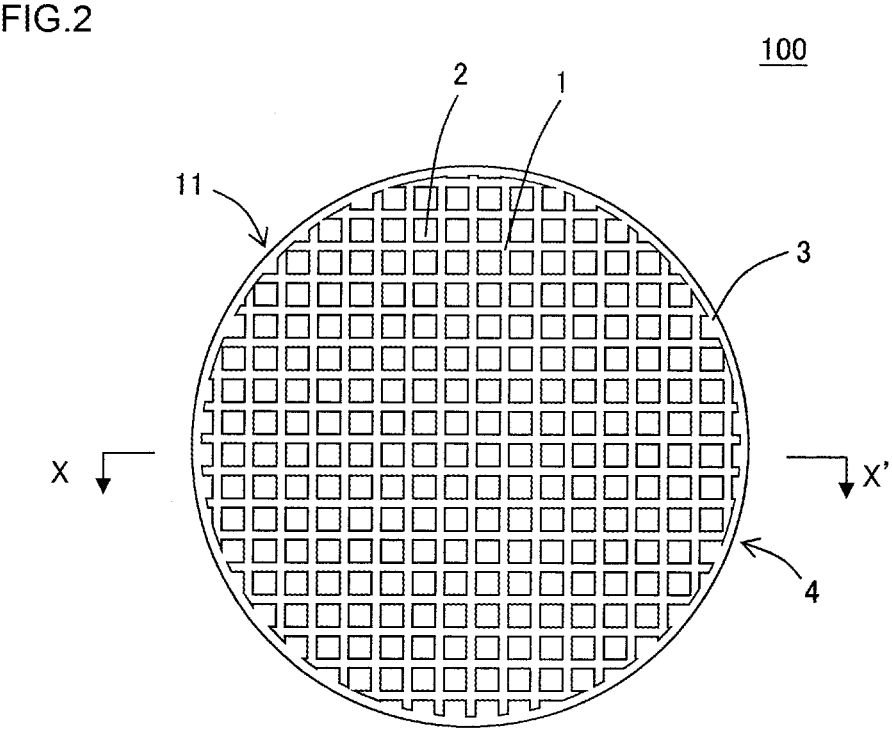
FIG. 2 is a plan view schematically showing an inflow end face of the honeycomb structure shown in FIG. 1.
Figure 3:
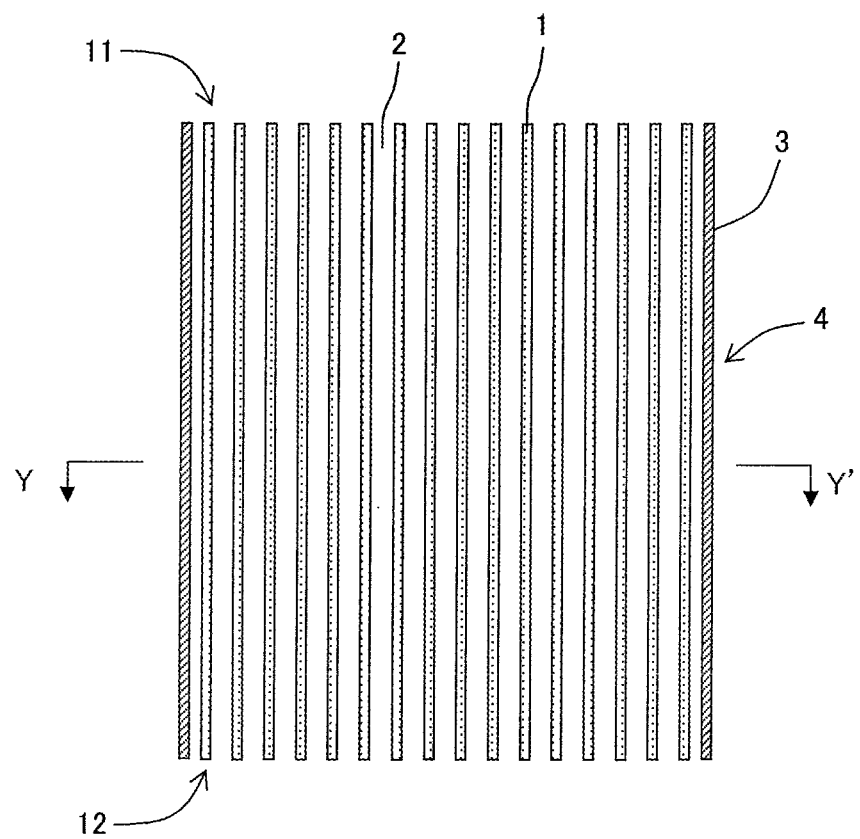
FIG. 3 is a cross-sectional view schematically showing a cross section along the X-X' line of FIG. 2.
Figure 4:
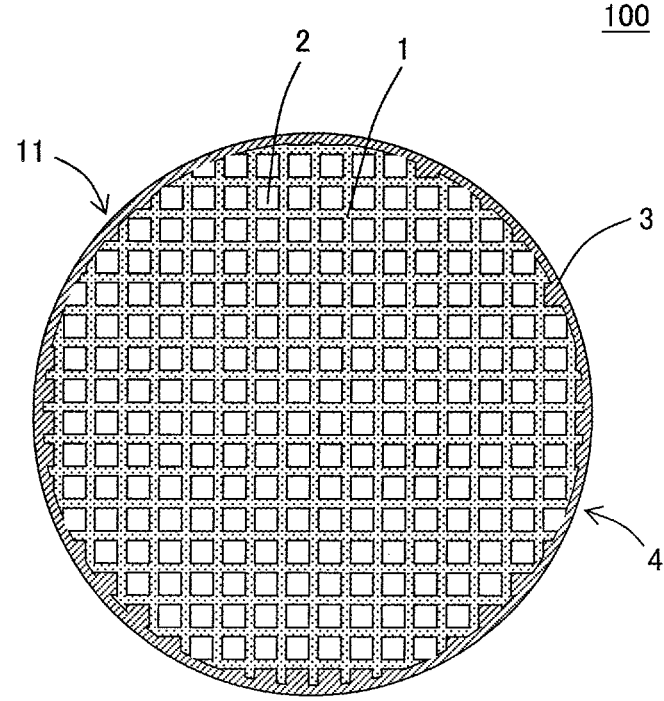
FIG. 4 is a cross-sectional view schematically showing a cross section along the Y-Y' line of FIG. 3.
Figure 5:
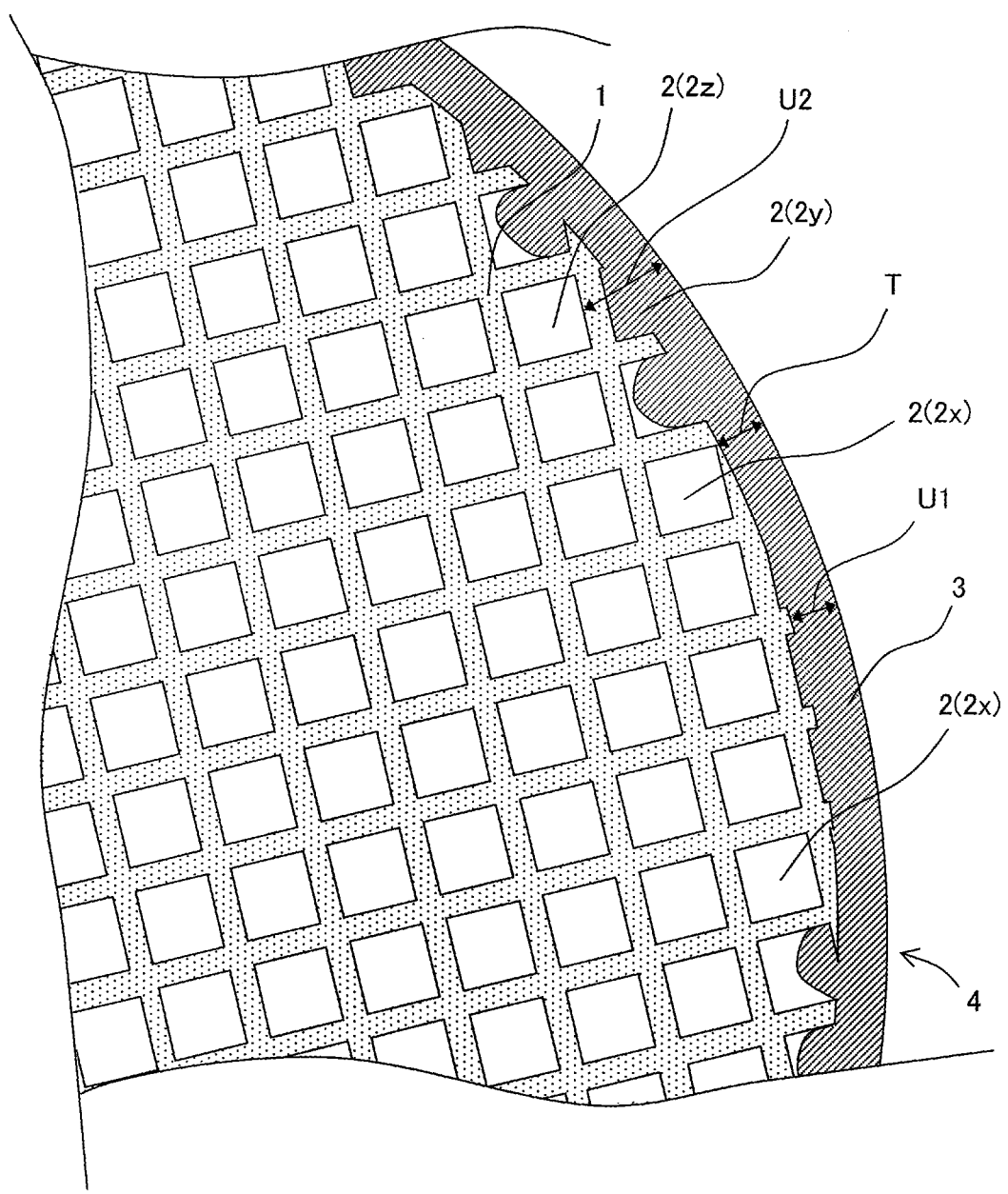
FIG. 5 is a partially enlarged view of the cross section of the honeycomb structure shown in FIG. 4.

Here, FIG. 1 is a perspective view schematically showing the one embodiment of the honeycomb structure of the present invention. FIG. 2 is a plan view schematically showing the inflow end face of the honeycomb structure shown in FIG. 1. FIG. 3 is a cross-sectional view schematically showing a cross section along the X-X' line of FIG. 2. FIG. 4 is a cross-sectional view schematically showing a cross section along the Y-Y' line of FIG. 3. FIG. 5 is a partially enlarged view of the cross section of the honeycomb structure shown in FIG. 4.

In the honeycomb structure 100 of the present embodiment, the cells 2 having the following constitution are defined as outermost circumference complete cells $2x$. The outermost circumference complete cells $2x$ are the cells 2 which are formed at an outermost circumference of the honeycomb structure body 4 and the cells 2 in which peripheries of the cells 2 are defined by the partition walls 1 without any lacks and the circumferential coating layer 3 does not penetrate inner portions of the cells 2. In other words, the outermost circumference complete cells $2x$ are the cells 2 in which all the peripheries of the cells 2 are defined by the partition walls 1. On the other hand, the cells 2 which are formed at the outermost circumference of the honeycomb structure body 4 and the cells 2 in which the peripheries of the cells are lacked due to chips of the partition walls 1 are defined as outermost circumference incomplete cells $2y$. Usually, the circumferential coating layer 3 penetrates inner portions of the outermost circumference incomplete cells $2y$.

Figure 6:
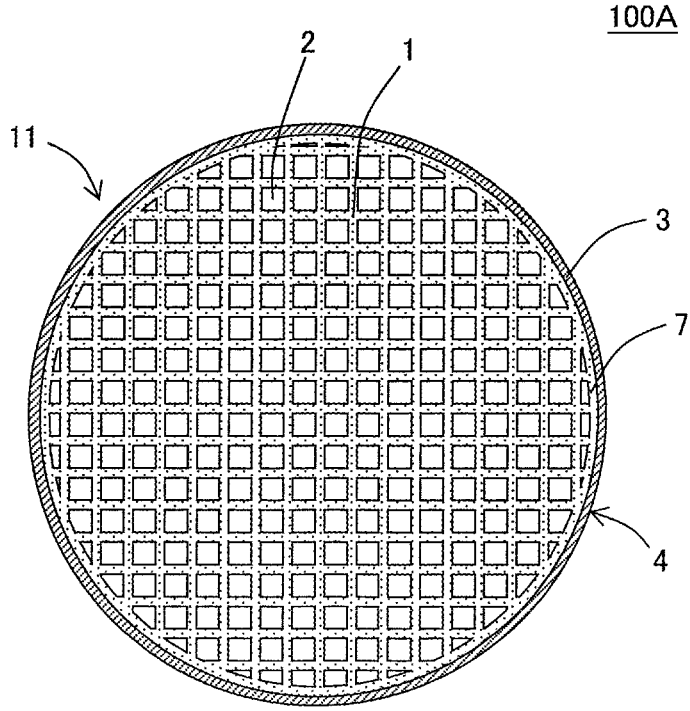
FIG. 6 is a plan view to explain another example of the one embodiment of the honeycomb structure of the present invention.

Furthermore, in the honeycomb structure of the present embodiment, as shown in FIG. 6, the honeycomb structure body 4 may have a circumferential wall 7 disposed to surround the porous partition walls 1. The circumferential wall 7 is formed integrally with the partition walls 1 when forming the partition walls 1 of the honeycomb structure body 4. In a honeycomb structure 100A shown in FIG. 6, a circumferential coating layer 3 is further disposed to surround a circumference of a honeycomb structure body 4 having partition walls 1 and a circumferential wall 7. In the honeycomb structure body 4, the cells 2 whose peripheries are defined only by the partition walls 1 or by the partition walls 1 and the circumferential wall 7 are referred to as complete cells. Here, FIG. 6 is a plan view to explain another example of the one embodiment of the honeycomb structure of the present invention.

Furthermore, drawing is omitted, but in a case where the honeycomb structure body has the circumferential wall, the above-mentioned circumferential wall may be disposed to cover the whole region of a side surface of the honeycomb structure body, or the above-mentioned circumferential wall may be disposed to cover a part of the side surface of the honeycomb structure body. For example, the honeycomb structure body in which the circumferential wall is disposed to cover the whole region of the side surface may be subjected to processing such as grinding processing to remove a part of the circumferential wall. It is to be noted that in a case where the honeycomb structure body in which the circumferential wall is disposed to cover the whole region of the side surface is processed to remove all the circumferential wall, the honeycomb structure body 4 shown in FIG. 1 to FIG. 5 is obtained.

In the honeycomb structure 100, a cross section of the honeycomb structure body 4 which is perpendicular to an extending direction of the cells 2 is characterized by satisfying relations of Equation (1) and Equation (2) as follows. Here, in Equation (1), T is a minimum distance T (mm) among distances from the outermost circumference complete cells $2x$ to the surface of the circumferential coating layer 3. In Equation (1) and Equation (2), P is a porosity P (%) of the circumferential coating layer. Hereinafter, the above-mentioned "minimum distance T (mm) among the distances from the outermost circumference complete cells $2x$ to the surface of the circumferential coating layer 3" will be referred to as "the minimum distance T (mm) from the outermost circumference complete cell $2x$ to the surface of the circumferential coating layer 3" sometimes. Furthermore, the distance will simply be referred to as "the minimum distance T (mm)" sometimes.

$$1.5 \geq T \geq 16 \times (100-P)^{-1.4}; \text{ and} \quad \text{Equation (1):}$$

$$20 \leq P \leq 75. \quad \text{Equation (2):}$$

The honeycomb structure 100 of the present embodiment satisfies the above-mentioned relations of Equation (1) and Equation (2), whereby a thickness of the circumferential coating layer 3 can decrease, but the circumferential coating layer can be hard to be damaged. For example, in the honeycomb structure 100 satisfying the above-mentioned relations of Equation (1) and Equation (2), during a treatment, it is possible to effectively inhibit the circumferential coating layer 3 from being chipped and damaged, and it is possible to effectively inhibit such a hole that passes through the circumferential coating layer 3 from being opened.

When the above-mentioned "minimum distance T (mm) from the outermost circumference complete cell $2x$ to the surface of the circumferential coating layer 3" is smaller than "$16 \times (100-P)^{-1.4}$", sufficient strength of the honeycomb structure 100 cannot be maintained. Furthermore, the circumferential coating layer 3 chips to be damaged and such a hole that passes through the circumferential coating layer 3 is easy to open. On the other hand, when the "minimum distance T (mm)" is in excess of 1.5 mm, the circumferential coating layer 3 excessively thickens, thereby increasing pressure loss of the honeycomb structure 100 irrespective of a value of the porosity P (%) of the circumferential coating layer 3. Consequently, when the honeycomb structure 100 is mounted in a vehicle, an exhaust resistance increases to cause deterioration of a fuel efficiency.

Equation (1) mentioned above is stipulate by the value of "the porosity P (%)" which satisfies the above-mentioned conditions of Equation (2). When the value of the porosity P (%) does not satisfy the above-mentioned conditions of Equation (2), the circumferential coating layer 3 might chip to be damaged or the hole that passes through the circumferential coating layer 3 might be easy to open even in a case of satisfying the conditions of Equation (1). Furthermore, when the value of the porosity P (%) of the circumferential coating layer 3 is in excess of 75%, the strength of the honeycomb structure 100 becomes insufficient, and when the honeycomb structure is canned in a can member for use in an exhaust gas purifying device, it becomes difficult to hold the honeycomb structure with a sufficient holding force. When the value of the porosity P (%) of the circumferential coating layer 3 is smaller than 20%, cracks might be caused due to drying shrinkage of a coating material that is a material of the circumferential coating layer during preparation of the circumferential coating layer.

Here, description will be made as to "the minimum distance T (mm) from the outermost circumference complete cell $2x$ to the surface of the circumferential coating layer 3" in more detail with reference to FIG. 5. As shown in FIG. 5, in the cross section of the honeycomb structure body 4 which is perpendicular to the extending direction of the cells 2, the plurality of cells 2 are defined by the porous partition walls 1. Here, cells $2z$ other than the cells $2x$ and $2y$ formed at the outermost circumference of the honeycomb structure body 4 are constituted so that the whole regions of peripheries of the cells 2 are usually defined by the partition walls 1. The cells $2z$ are referred to as, for example, "the complete cells $2z$" sometimes. On the other hand, as the cells $2x$ and $2y$ formed at the outermost circumference of the honeycomb structure body 4, there are present the cells $2x$ in which the whole regions of the peripheries of the cells 2 are defined by the partition walls 1 and the cells $2y$ in which the partition walls 1 to be present around the cells 2 are lacked.

For example, in "the cells $2x$ formed at the outermost circumference" denoted with sign $2x$ in FIG. 5, the whole regions of the peripheries of the cells $2x$ are defined by the partition walls 1, and referred to as "the outermost circumference complete cells $2x$" in the present specification. Furthermore, in "the cells $2y$ formed at the outermost circumference" denoted with sign $2y$ in FIG. 5, parts of the partition walls 1 which are to be present around the cells 2 are lacked, and in the present specification, the cells are referred to as "the outermost circumference incomplete cells $2y$". Usually in the honeycomb structure 100 including the circumferential coating layer 3, in a case where "the outermost circumference incomplete cells $2y$" are present at the outermost circumference of the honeycomb structure body 4, the circumferential coating layer 3 penetrates inner portions of the outermost circumference incomplete cells $2y$.

"The minimum distance from the outermost circumference complete cell $2x$ to the surface of the circumferential coating layer 3" is defined as a distance to the surface of the circumferential coating layer 3 in a normal direction. For example, in FIG. 5, a plurality of outermost circumference incomplete cells $2y$ are also present at the outermost circumference of the honeycomb structure body 4, but the outermost circumference incomplete cells $2y$ are not taken into consideration when observing "the minimum distance T (mm)". In FIG. 5, an arrow denoted with sign T indicates "the minimum distance T (mm)". "The minimum distance T (mm)" includes a thickness t1 (mm) (not shown) of the partition wall 1 defining the outermost circumference complete cell $2x$ and a thickness t2 (mm) (not shown) of the circumferential coating layer 3.

Furthermore, in FIG. 5, an arrow denoted with sign U1 indicates a distance corresponding to a thickness of a circumferential portion of the honeycomb structure body 4, but the distance U1 is not "the distance from the outermost circumference complete cell $2x$ to the surface of the circumferential coating layer 3". That is, the distance U1 is the distance from the surface of the circumferential coating layer 3 to the partition wall 1 which only defines the outermost circumference incomplete cell $2y$. Therefore, when obtaining "the minimum distance T (mm)", the distance U1 is not taken into consideration.

Furthermore, in FIG. 5, an arrow denoted with sign U2 indicates a distance corresponding to the thickness of the circumferential portion of the honeycomb structure body 4, but the distance U2 is not "the distance from the outermost circumference complete cell $2x$ to the surface of the circumferential coating layer 3". That is, the distance U2 is the distance from the surface of the circumferential coating layer 3 through the outermost circumference incomplete cell $2y$ to the complete cell $2z$ formed on a further inner side. Therefore, when obtaining "the minimum distance T (mm)", the distance U2 is not taken into consideration.

"The minimum distance T (mm)" can be measured by performing image analysis of the cross section of the honeycomb structure cut perpendicularly to the cell extending direction. Specifically, first the honeycomb structure is cut perpendicularly to the cell extending direction. Further, a circumferential portion of a cut surface of this honeycomb structure is observed with a scanning type electronic microscope or a microscope, and "the minimum distance T (mm)" from the outermost circumference complete cell to the surface of the circumferential coating layer is measured. It is to be noted that in a case where the cell extending direction of the honeycomb structure extends in a direction perpendicular to the inflow end face and the outflow end face, the measurement of "the minimum distance T (mm)" may be performed on at least one optional cross section. Furthermore, in a case where the cell extending direction of the honeycomb structure extends in a direction perpendicular to the inflow end face and the outflow end face, the above-mentioned observation of the cross section may be replaced with observation of the inflow end face and the outflow end face of the honeycomb structure. The measurement of "the minimum distance T (mm)" is performed as to all "the outermost circumference complete cells" in the above-mentioned cross section, the inflow end face, or the outflow end face. As the scanning type electronic microscope, S-3400N (tradename) manufactured by Hitachi High-Technologies Corporation is usable. As the microscope, VHK-1000 (tradename) manufactured by KEYENCE CORPORATION is usable. When measuring the thickness of the circumferential coating layer, the measurement can be performed by using image processing software of WinROOF (tradename) manufactured by MITANI CORPORATION. Hereinafter, an image imaged by the scanning type electronic microscope will be referred to as the SEM image sometimes. The "SEM" is an abbreviation for a scanning electron microscope.

"The porosity P (%) of the circumferential coating layer" can be measured by performing the image analysis of the cross section of the honeycomb structure which is perpendicular to the cell extending direction. Specifically, the cross section of the circumferential coating layer of the honeycomb structure is photographed in 3 optional viewing fields of the SEM image with the scanning type electronic microscope. A magnification during the photographing is set to 150 times and an observation range per viewing field is a quadrangular range in which a length of one side is from 300 to 500 µm. Next, as to each photographed SEM image, binarization is performed by the image analysis and the image is divided into cavity portions (i.e., pore portions) and portions other than the cavity portions (i.e., solid portions of the partition walls). Next, an area of each cavity portion is obtained. A percentage value obtained by dividing "a total area of the cavity portions" by "an area of the observation range per viewing field" is defined as the porosity (%) per viewing field. Further, an arithmetic average value of the respective porosities of the 3 viewing fields is defined as "the porosity P (%) of the circumferential coating layer". As the scanning type electronic microscope, S-3400N (tradename) manufactured by Hitachi High-Technologies Corporation is usable. Furthermore, the image analysis of the photographed image can be performed by using the image processing software of WinROOF (tradename) manufactured by MITANI CORPORATION.

The porosity P (%) of the circumferential coating layer is preferably from 20 to 75%, further preferably from 25 to 70%, and especially preferably from 25 to 65%. According to such a constitution, it is possible to obtain the honeycomb structure in which cracks are hard to be generated during the preparation of the circumferential coating layer and which has sufficient strength for use as an exhaust gas purifying member.

It is preferable that the minimum distance T (mm) from the outermost circumference complete cell to the surface of the circumferential coating layer further satisfies a relation of Equation (3) mentioned below. That is, it is preferable that the minimum distance T (mm) is 0.03 mm or more and 1.5 mm or less. Furthermore, the minimum distance T (mm) is further preferably from 0.03 to 1.0 mm and especially preferably from 0.03 to 0.8 mm. When the minimum distance T (mm) is smaller than 0.03 mm, the sufficient strength of the honeycomb structure might not be maintained. When the minimum distance T (mm) is in excess of 1.5 mm, the circumferential coating layer might excessively thickens, thereby increasing the pressure loss of the honeycomb structure. Consequently, when the honeycomb structure is mounted in the vehicle, the exhaust resistance increases to cause the deterioration of the fuel efficiency.

$$T \geq 0.03 \qquad \text{Equation (3):}$$

The minimum distance T (mm) includes the thickness t1 (mm) of the partition walls defining the outermost circumference complete cells and the thickness t2 (mm) of the circumferential coating layer. It is to be noted that in a case where the honeycomb structure body has the circumferential wall, a thickness of this circumferential wall is also included in the minimum distance T (mm). It is preferable that the thickness t2 (mm) of the range where the circumferential coating layer is disposed in the minimum distance T (mm) is from. 0.025 to 1.0 mm. According to such a constitution, it is possible to effectively achieve compatibility between inhibition of damages on the circumferential coating layer and formation of a thin wall. The thickness t1 (mm) of the partition walls defining the outermost circumference complete cells and the thickness t2 (mm) of the circumferential coating layer can be obtained by performing the image analysis of the SEM image when measuring the minimum distance T (mm).

It is preferable that in the cross section of the circumferential coating layer, a total area Sp ($\mu m^2$) of pores formed in the circumferential coating layer and a total peripheral length Lp ($\mu m$) of the pores formed in the circumferential coating layer further satisfy a relation of Equation (4) mentioned below. When satisfying Equation (4) and loading a catalyst onto the partition walls of the honeycomb structure body, it is possible to remarkably effectively inhibit the catalyst from oozing out from the circumferential coating layer. It is to be noted that a value of "$4 \times Sp/Lp$" in Equation (4) indicates a value of an average pore diameter of the circumferential coating layer. Hereinafter, in the present specification, "$4 \times Sp/Lp$" in Equation (4) will be referred to as "an average pore diameter M ($\mu m$) of the circumferential coating layer" sometimes.

$$4 \times Sp/Lp \leq 45 \qquad \text{Equation (4):}$$

The total area Sp ($\mu m^2$) of the pores formed in the circumferential coating layer and the total peripheral length Lp ($\mu m$) of the pores formed in the circumferential coating layer can be obtained by performing the image analysis of the SEM image when measuring the porosity P (%) of the circumferential coating layer.

As represented by Equation (4), the average pore diameter M ($\mu m$) of the circumferential coating layer is preferably 45 $\mu m$ or less, further preferably 40 $\mu m$ or less, and especially preferably 30 m or less. There is not any special restriction on a lower limit value of the average pore diameter M ($\mu m$) of the circumferential coating layer, but a substantially lower limit value is, for example, 1 $\mu m$.

There is not any special restriction on a shape of the cells in the cross section perpendicular to the cell extending direction. Examples of the shape include polygonal shapes such as a triangular shape, a quadrangular shape, a hexagonal shape, and an octagonal shape. Furthermore, in the shapes of the cells, the shape of one cell may be different from the shape of the other cell.

There is not any special restriction on the whole shape of the honeycomb structure. In the whole shape of the honeycomb structure of the present embodiment, the shape of the inflow end face and outflow end face is preferably round or elliptic and especially preferably round. Furthermore, there is not any special restriction on a size of the honeycomb structure, but it is preferable that a length from the inflow end face to the outflow end face is from 30 to 450 mm. Furthermore, in a case where the whole shape of the honeycomb structure is a round pillar shape, it is preferable that a diameter of each end face is from 25 to 400 mm.

It is preferable that the material of the circumferential coating layer includes at least one selected from a first material group consisting of silicon carbide, cordierite, a silicon-silicon carbide based composite material, silicon nitride, mullite, alumina, a silicon carbide-cordierite based composite material, and aluminum titanate. Further, the material of the circumferential coating layer contains preferably 20 mass % or more, further preferably 25 mass % or more, and especially preferably 30 mass % or more of at least one selected from the above first material group. Especially from the viewpoint of close contact properties with the honeycomb structure body, it is especially preferable that the material of the circumferential coating layer includes a material included in the honeycomb structure body.

A thickness of the partition walls of the honeycomb structure body is preferably from 0.05 to 0.5 mm, further preferably from 0.06 to 0.4 mm, and especially preferably from 0.07 to 0.35 mm. When the thickness of the partition walls is smaller than 0.05 mm, the sufficient strength of the honeycomb structure might not be maintained. When the thickness of the partition walls is in excess of 0.5 mm, the pressure loss of the honeycomb structure might increase. Consequently, when the honeycomb structure is mounted in the vehicle, the exhaust resistance increases to cause the deterioration of the fuel efficiency. The thickness of the partition walls is a value measured by observing the shape of the cross section of the honeycomb structure with the scanning type electronic microscope.

A porosity of the partition walls of the honeycomb structure body is preferably from 20 to 75%, further preferably from 25 to 70%, and especially preferably from 25 to 65%. When the porosity of the partition walls is smaller than 20% and the honeycomb structure is used as a filter, the pressure loss might increase. When the porosity of the partition walls is in excess of 75%, the strength of the honeycomb structure 100 becomes insufficient, and when the honeycomb structure is canned in the can member for use in the exhaust gas purifying device, it might become difficult to hold the honeycomb structure with the sufficient holding force. The value of the porosity of the partition walls is a value measured with a mercury porosimeter.

A cell density of the honeycomb structure body is preferably from 15 to 200 cells/cm², further preferably from 20 to 150 cells/cm², and especially preferably from 30 to 100 cells/cm². When the cell density is smaller than 15 cells/cm², the strength of the honeycomb structure might run short. When the cell density is in excess of 200 cells/cm², the pressure loss of the honeycomb structure might increase, and when the catalyst is loaded onto the honeycomb structure, the cells might be clogged with the loaded catalyst.

It is preferable that a material of the honeycomb structure body includes at least one selected from a second material group consisting of silicon carbide, cordierite, a silicon-silicon carbide based composite material, silicon nitride, mullite, alumina, a silicon carbide-cordierite based composite material, and aluminum titanate. Further, the material of the honeycomb structure body contains preferably 30 mass % or more, further preferably 40 mass % or more and especially preferably 50 mass % or more of at least one selected from the above second material group.

The honeycomb structure of the present embodiment is suitably usable as an exhaust gas purifying member of an internal combustion engine. The honeycomb structure is suitably utilizable as, for example, a catalyst carrier onto which an exhaust gas purifying catalyst is loaded. In the honeycomb structure of the present embodiment, the exhaust gas purifying catalyst may be loaded onto at least one of the surface of each partition wall of honeycomb structure body and each pore of the partition wall.

Figure 7:
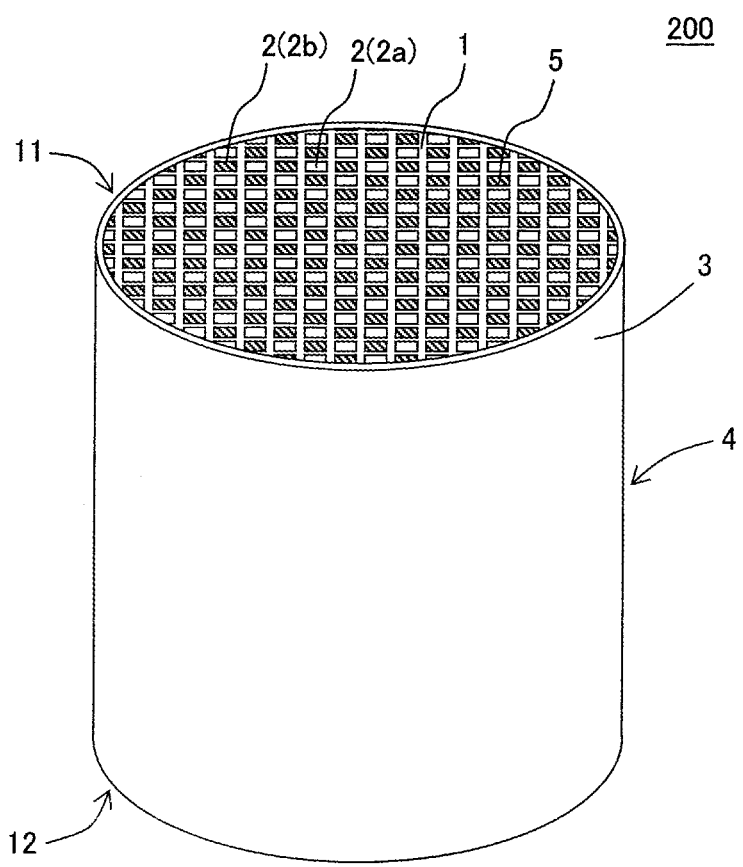
FIG. 7 is a perspective view schematically showing another embodiment of the honeycomb structure of the present invention.
Figure 8:
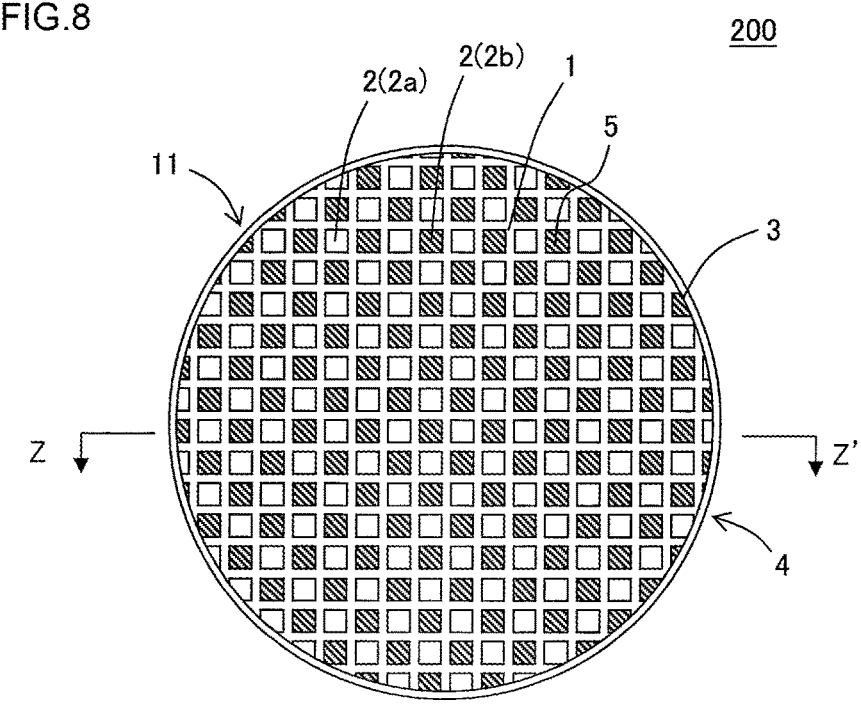
FIG. 8 is a plan view schematically showing an inflow end face of the honeycomb structure shown in FIG. 7.
Figure 9:
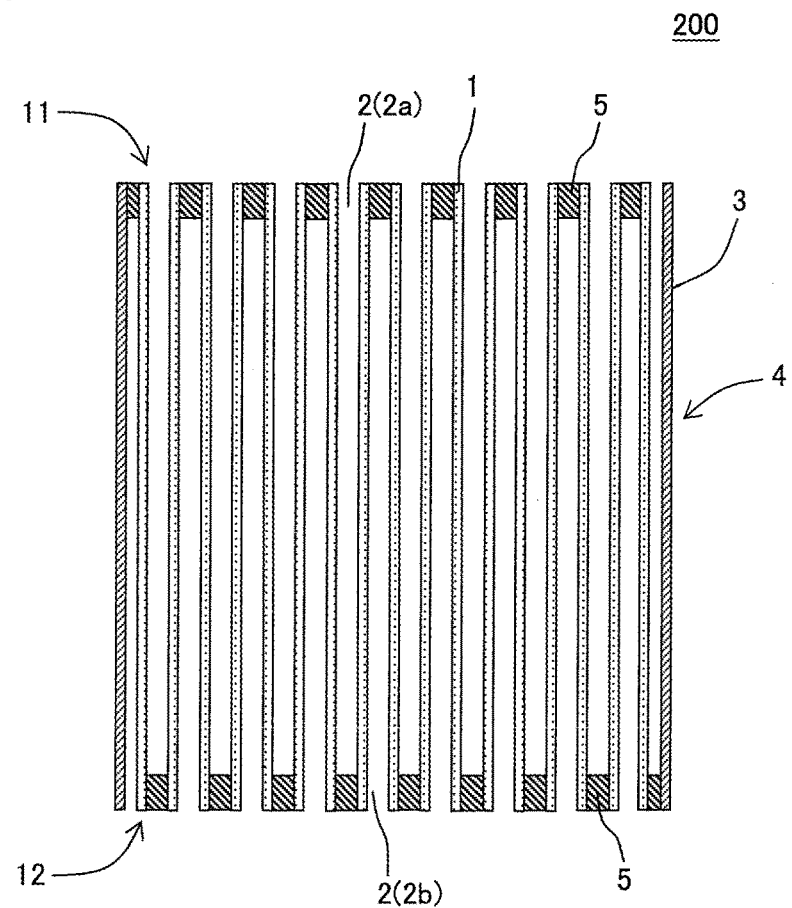
FIG. 9 is a cross-sectional view schematically showing a cross section along the Z-Z' line of FIG. 8.

Next, another embodiment of the honeycomb structure of the present invention will be described. As shown in FIG. 7 to FIG. 9, the other embodiment of the honeycomb structure of the present invention is a honeycomb structure 200 including a honeycomb structure body 4, a circumferential coating layer 3, and plugging portions 5 each of which is disposed in one of end portions of each cell 2 formed in the honeycomb structure body 4. The honeycomb structure body 4 has porous partition walls 1. The porous partition walls 1 define a plurality of cells 2 extending from an inflow end face 11 to an outflow end face 12 to become through channels for fluid. The plugging portions 5 are disposed at open ends of the cells 2 on the side of the inflow end face 11 or the outflow end face 12, to plug one of the end portions of the cell 2. Here, among the plurality of cells 2, the cells 2 in which the plugging portions 5 are disposed at the open ends on the outflow end face 12 side and whose inflow end face 11 side is opened are defined as inflow cells 2a. Furthermore, among the plurality of cells 2, the residual cells 2 other than the inflow cells 2a, i.e., the cells 2 in which the plugging portions 5 are disposed at the open ends on the inflow end face 11 side and whose outflow end face 12 side is opened are defined as outflow cells 2b.

FIG. 7 is a perspective view schematically showing the other embodiment of the honeycomb structure of the present invention. FIG. 8 is a plan view schematically showing the inflow end face of the honeycomb structure shown in FIG. 7. FIG. 9 is a cross-sectional view schematically showing a cross section along the Z-Z' line of FIG. 8.

The honeycomb structure body 4 and the circumferential coating layer 3 for use in the honeycomb structure 200 of the present embodiment shown in FIG. 7 to FIG. 9 are constituted similarly to the honeycomb structure body 4 and the circumferential coating layer 3 shown in FIG. 1 to FIG. 5. Also in the honeycomb structure 200 of the present embodiment having such a constitution, it is possible to obtain an operation and an effect similar to those of the honeycomb structure 100 shown in FIG. 1 to FIG. 5. That is, a thickness of the circumferential coating layer 3 can decrease and the circumferential coating layer can be hard to be damaged. It is to be noted that the honeycomb structure 200 of the present embodiment is usable as an exhaust gas purifying filter. Furthermore, when pores of the circumferential coating layer 3 are controlled and a catalyst is loaded onto the partition walls 1 of the honeycomb structure body 4, it is possible to effectively inhibit the catalyst from oozing out from the circumferential coating layer 3.

It is preferable that the plugging portions 5 are made of a material which includes ceramics. It is preferable that a material constituting the plugging portions 5 includes at least one selected from "a second material group" illustrated as the hitherto described material constituting the partition walls.

Figure 10:
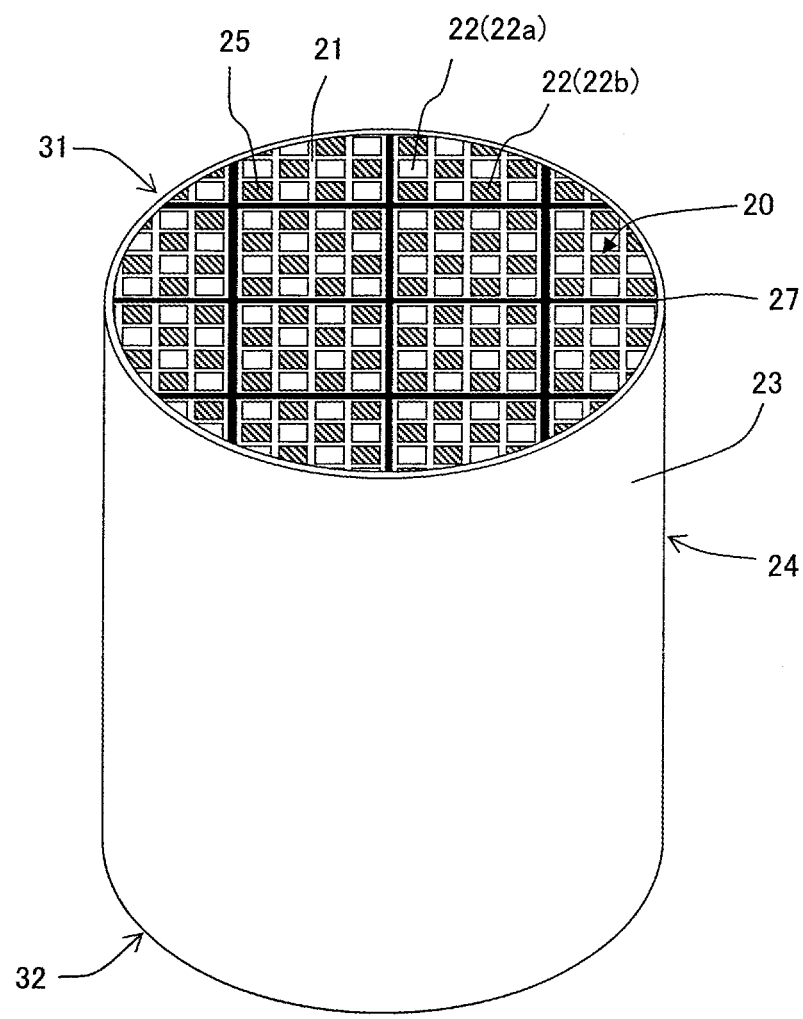
FIG. 10 is a perspective view schematically showing still another embodiment of the honeycomb structure of the present invention.

Next, still another embodiment of the honeycomb structure of the present invention will be described. As shown in FIG. 10, the other embodiment of the honeycomb structure of the present invention is a honeycomb structure 300 including a honeycomb structure body 24, a circumferential coating layer 23, and plugging portions 25 each of which is disposed in one of end portions of each cell 22 formed in the honeycomb structure body 24. In the honeycomb structure body 24, a plurality of honeycomb segments 20 are bonded via a bonding layer 27. Each of the honeycomb segments 20 has porous partition walls 21. The porous partition walls 21 define a plurality of cells 22 extending from an inflow end face 31 to an outflow end face 32. The plugging portions 25 are disposed at open ends of the cells 22 on the side of the inflow end face 31 or the outflow end face 32 to plug one of end portions of each cell 22. Sign 22a indicates inflow cells 22a and sign 22b indicates outflow cells 22b.

FIG. 10 is a perspective view schematically showing the other embodiment of the honeycomb structure of the present invention. It is to be noted that in the honeycomb structure 300 of the present embodiment, the honeycomb structure body 24 does not have to include the plugging portions 25 as long as the plurality of honeycomb segments 20 are bonded.

Also as to the honeycomb structure 300 of the present embodiment shown in FIG. 10, a minimum distance T (mm) from an outermost circumference complete cell to the surface of the circumferential coating layer 23 and a porosity P (%) of the circumferential coating layer 23 satisfy the hitherto described relations of Equation (1) and Equation (2). According to such a constitution, a thickness of the circumferential coating layer 23 can decrease but the circumferential coating layer can be hard to be damaged. Furthermore, when pores of the circumferential coating layer 23 are controlled and a catalyst is loaded onto the partition walls 21 of the honeycomb structure body 24, it is possible to effectively inhibit the catalyst from oozing out from the circumferential coating layer 23.

In the honeycomb structure body 24 in which the plurality of honeycomb segments 20 are bonded, a plurality of prismatic columnar honeycomb segments 20 are bonded via the bonding layer 27 and a circumferential portion of the honeycomb structure body is ground into a desirable shape. Consequently, in the honeycomb structure body 24 in which the plurality of honeycomb segments 20 are bonded, it is essential to dispose the circumferential coating layer to surround a circumference of the honeycomb structure body, and the honeycomb structure body produces an especially suitable effect in a case of applying a technology of the present invention. A constitution of the honeycomb segment 20 can confirm to a heretofore known honeycomb structure of a segment structure.

(2) Manufacturing Method of Honeycomb Structure:

Next, a manufacturing method of the honeycomb structure of the present invention will be described.

When manufacturing the honeycomb structure of the present invention, a forming raw material to form a honeycomb formed body is first prepared. It is preferable that the forming raw material contains a ceramic raw material.

As the ceramic raw material contained in the forming raw material, for example, at least one selected from the following "material group" is preferable. "The material group" is a group consisting of silicon carbide, cordierite, a cordierite forming raw material, a silicon-silicon carbide based composite material, silicon nitride, mullite, alumina, a silicon carbide-cordierite based composite material, and aluminum titanate. By use of the raw material, it is possible to obtain a honeycomb structure excellent in strength and heat resistance. It is to be noted that the cordierite forming raw material is a ceramic raw material blended to obtain a chemical composition in which silica falls in a range of 42 to 56 mass %, alumina falls in a range of 30 to 45 mass %, and magnesia falls in a range of 12 to 16 mass %. Further, the cordierite forming raw material is fired to become cordierite.

It is preferable to prepare the forming raw material by mixing the above ceramic raw material with a pore former, a binder, a dispersing agent, a surfactant, a dispersing medium and the like.

As the pore former, the binder, the dispersing agent, the surfactant, the dispersing medium and the like, those for use in a heretofore known honeycomb structure manufacturing method are usable. Furthermore, amounts of the pore former, the binder, the dispersing agent, the surfactant, the dispersing medium and the like to be used can suitably be determined in accordance with physical properties and the like of the honeycomb structure to be prepared.

When forming the honeycomb formed body by use of the forming raw material, it is preferable that the forming raw material is first kneaded to obtain a kneaded material and the obtained kneaded material is formed into a honeycomb shape. It is preferable that the honeycomb formed body has a pillar shape including partition walls defining a plurality of cells and a circumferential wall disposed to surround the partition walls. Furthermore, in a case where the honeycomb structure to be manufactured is the honeycomb structure of the segment structure, there are prepared, as honeycomb formed bodies, a plurality of prismatic columnar honeycomb formed bodies in which a shape of a cross section perpendicular to an axial direction is a quadrangular shape or the like.

There is not any special restriction on a method of kneading the forming raw material to form the kneaded material, and an example of the method is a method using, for example, a kneader, a vacuum pugmill or the like.

There is not any special restriction on a method of forming the kneaded material to form the honeycomb formed body, and a forming method such as an extrusion method, an injection molding method or a press molding method is usable.

It is preferable that the obtained honeycomb formed body is dried after the honeycomb formed body is formed. There is not any special restriction on a drying method, but examples of the method include hot air drying, microwave drying, induction heating, decompression drying, vacuum drying, and freeze drying.

Next, in a case of manufacturing a honeycomb structure including plugging portions to plug open ends of cells, plugging portions may be formed in a dried honeycomb formed body. It is to be noted that in a case of forming the plugging portions, the plugging portions may be formed after the honeycomb formed body is fired. It is preferable that the plugging portions are formed by using ceramics excellent in heat resistance and corrosion resistance in the same manner as in the honeycomb formed body. The method of forming the plugging portions can be carried out in conformity with a manufacturing method of a honeycomb filter using a heretofore known honeycomb structure.

Next, the honeycomb formed body is fired to prepare a honeycomb fired body. "The firing" means an operation of sintering and densifying the forming raw material constituting the honeycomb formed body to acquire predetermined strength. Firing conditions in the firing vary in accordance with a type of forming raw material, and hence appropriate conditions may be selected in accordance with the type.

It is preferable to calcinate the honeycomb formed body before firing the honeycomb formed body. The calcinating is carried out for degreasing, and there is not any special restriction on a calcinating method as long as organic substances such as the binder, the dispersing agent and the pore former in the honeycomb formed body can be removed.

Next, a circumferential portion of the obtained honeycomb fired body may be subjected to grinding processing or the like, thereby removing a circumferential wall of the honeycomb fired body. When such grinding processing is carried out, a shape of the honeycomb fired body can be adjusted into a desirable shape. For example, in a case where distortion or the like occurs in the shape of the honeycomb fired body due to firing shrinkage or the like during the firing, the circumferential portion is subjected to the grinding processing, so that it is possible to adjust the shape of the honeycomb fired body. There is not any special restriction on a grinding processing method, and the method can be carried out in conformity with a method for use in manufacturing the heretofore known honeycomb structure including the circumferential coating layer.

In a case where the honeycomb structure to be manufactured is the honeycomb structure of the segment structure, it is preferable that a plurality of prepared honeycomb formed bodies are bonded via a bonding material to prepare a honeycomb bonded body in which a plurality of honeycomb segments are bonded. Further, it is preferable that the grinding processing of a circumferential portion of the prepared honeycomb bonded body is performed to prepare the honeycomb bonded body of a desirable shape.

Next, a circumferential coating material to prepare the circumferential coating layer is prepared. It is preferable to prepare the circumferential coating material by mixing the ceramic raw material with the pore former, the binder, the dispersing agent, the surfactant, the dispersing medium and the like. When preparing the circumferential coating material, it is preferable to adjust a formulation of the circumferential coating material so that a porosity of the circumferential coating layer prepared by drying the circumferential coating material, followed by firing when necessary, is from 20 to 75%.

Next, the circumference of the honeycomb fired body subjected to the grinding processing is coated with the circumferential coating material. There is not any special restriction on a coating method with the circumferential coating material, and the method can be carried out in conformity with a method for use in manufacturing the heretofore know honeycomb structure including the circumferential coating layer. However, when manufacturing the honeycomb structure of the present invention, a coating thickness of the circumferential coating material is adjusted so that the minimum distance T (mm) from the outermost circumference complete cell to the surface of the circumferential coating layer and the porosity P (%) of the circumferential coating layer satisfy Equation (1) and Equation (2) which are described above. It is to be noted that as the porosity P (%) of the circumferential coating layer, a value estimated from the formulation of the circumferential coating material may be used, or there may be measured a porosity (%) of a circumferential coating layer prepared separately by using a circumferential coating material of the same formulation. Furthermore, as to the coating thickness of the circumferential coating material, it is preferable to determine the coating thickness of the material in consideration of shrinkage during the drying or firing. For example, a shrinkage ratio N (%) of the circumferential coating material can be obtained as a percentage (%) of a value obtained by using the circumferential coating material of the same formulation to separately prepare the circumferential coating layer and dividing a thickness (mm) of the prepared circumferential coating layer by the coating thickness (mm) of the circumferential coating material during the preparation. Furthermore, when coating the honeycomb fired body with the circumferential coating material, a mass of the circumferential coating material to coat is managed, so that the coating thickness of the material to coat the circumference of the honeycomb fired body can be adjusted.

Specifically, the coating thickness of the circumferential coating material can be determined by such a method as mentioned below. First, an end face of the honeycomb fired body subjected to the grinding processing is observed with a microscope. Further, a thickness Ta (mm) of the partition walls defining the outermost circumference complete cells is measured. In this case, the thickness Ta (mm) of the partition walls is defined as a thickness of a circumferential shape of the honeycomb structure planned to be prepared in the normal direction. Furthermore, the shrinkage ratio N (%) of the circumferential coating material is obtained by the above-mentioned method or the like. Further, a coating thickness Tb (mm) of the circumferential coating material is determined to satisfy Equation (5) mentioned below.

$$1.5 \geq (Ta + Tb \times N/100) \geq 16 \times (100-P)^{-1.4}, \quad \text{Equation (5)}$$

in which Ta is the thickness (mm) of the partition walls defining the outermost circumference complete cells, Tb is the coating thickness (mm) of the circumferential coating material, N is the shrinkage (%) of the circumferential coating material, and P is the porosity (%) of the circumferential coating layer made of the circumferential coating material.

In Equation (5) mentioned above, "Ta+Tb×N/100" is a value corresponding to "T" in Equation (1), i.e., the minimum distance T (mm) from the outermost circumference complete cell to the surface of the circumferential coating layer. The coating thickness Tb (mm) of the circumferential coating material is determined to satisfy Equation (5), so that it is possible to simply manufacture the honeycomb structure of the present invention.

EXAMPLES

Example 1

80 parts by mass of silicon carbide powder and 20 parts by mass of Si powder were mixed to obtain mixed powder. To this mixed powder, a binder, a pore former and water were added to obtain a forming raw material. Next, the forming raw material was kneaded to prepare a round pillar-shaped kneaded material.

Next, the kneaded material was extruded by using a die of a predetermined shape, to obtain a honeycomb formed body having cells in which a shape of each open end in each end face was rectangular, and having the whole shape that was a quadrangular pillar shape. 16 honeycomb formed bodies were prepared.

Next, each honeycomb formed body was dried with a microwave drier and further completely dried with a hot air drier, and then both end faces of the honeycomb formed body were cut to adjust the honeycomb formed body into a predetermined dimension.

Next, plugging portions were formed in the dried honeycomb formed body. Specifically, an inflow end face of the honeycomb formed body was first masked to cover inflow cells. Afterward, a masked end portion of the honeycomb formed body was immersed into a plugging slurry to charge the plugging slurry into open ends of outflow cells which were not masked. Afterward, also as to an outflow end face of the honeycomb formed body, the plugging slurry was charged into open ends of the inflow cells in the same manner as in the above method. Afterward, the honeycomb formed body in which the plugging portions were formed was further dried with the hot air drier.

Next, the honeycomb formed body in which the plugging portions were formed was degreased and fired to obtain a honeycomb fired body. Degreasing conditions were set so that the degreasing was performed at 550° C. for 3 hours. Firing conditions were set so that the firing was performed at 1450° C. in argon atmosphere for 2 hours. In the honeycomb fired body, the whole shape was a quadrangular pillar shape. A shape of each end face of the honeycomb fired body was a square in which a length of one side was 39 mm.

Next, obtained 16 honeycomb fired bodies were bonded with a bonding material in a state where the honeycomb fired bodies were arranged adjacent to one another so that mutual side surfaces faced each other, to prepare a honeycomb bonded body. The honeycomb bonded body was prepared by bonding the 16 honeycomb fired bodies in total to arrange four bodies in a longitudinal direction and four bodies in a lateral direction in the end face.

Next, a circumferential portion of the honeycomb bonded body was ground and processed to adjust, into a round shape, a shape of a cross section of the honeycomb bonded body which was vertical to a cell extending direction. Afterward, an outermost circumference of the ground and processed honeycomb bonded body was coated with a circumferential coating material including a ceramic raw material. The circumferential coating material was prepared by the following method. First, as the raw material of the circumferential coating material, there was prepared a raw material containing 30 parts by mass of aluminosilicate fibers, 30 parts by mass of SiC particles, 30 parts by mass of water, and the remainder including an organic binder, a foamable resin and a dispersing agent. These materials were mixed to prepare the circumferential coating material. Coating with the circumferential coating material was carried out by a coating method while rotating the honeycomb bonded body. A coating thickness of the circumferential coating material was adjusted so that a minimum distance T of an obtained honeycomb structure was 1 mm.

The honeycomb bonded body coated with the circumferential coating material was thermally treated at 600° C., thereby preparing the honeycomb structure of Example 1. The obtained honeycomb structure included a honeycomb structure body constituted of the honeycomb bonded body and a circumferential coating layer made of the circumferential coating material.

In the obtained honeycomb structure, a porosity of partition walls was 41%. Furthermore, a thickness of the partition walls was 0.30 mm. A diameter of each end face was 152 mm and a length in the cell extending direction was 152 mm. Furthermore, a cell density was 46.5 cells/cm². The porosity of the partition walls was a value measured with a mercury porosimeter.

Furthermore, as to the obtained honeycomb structure, a porosity P (%) of the circumferential coating layer and an average pore diameter M (μm) were measured by the following methods. Table 1 shows the results.

(Porosity P [%])

First, as to a cross section of the circumferential coating layer of the honeycomb structure, 3 viewing fields of an SEM image were optionally photographed with a scanning type electronic microscope. A magnification during the photographing was set to 150 times and an observation range per viewing field was set to a quadrangular range in which a length of one side was 500 μm. Next, each photographed SEM image was binarized by image analysis to divide the image into cavity portions and portions other than the cavity portions. Next, an area of each cavity portion was obtained. A value of a percentage obtained by dividing a total area of the cavity portions by an area of the observation range per viewing field was defined as the porosity (%) per viewing field. Further, an arithmetic average value of the respective porosities of the 3 viewing fields was defined as the porosity P (%) of the circumferential coating layer. As the scanning type electronic microscope, there was used S-3400N (tradename) manufactured by Hitachi High-Technologies Corporation. Furthermore, in the image analysis, there was used image processing software of WinROOF (tradename) manufactured by MITANI CORPORATION.

(Average Pore Diameter M [μm])

In the SEM image in which the porosity P (%) was measured, there were obtained a total area Sp (μm²) of pores formed in the circumferential coating layer and a total peripheral length Lp (m) of the pores formed in the circumferential coating layer. Further, a value of "4×Sp/Lp" was defined as an average pore diameter M (μm) of the circumferential coating layer. Table 1 shows a value of the average pore diameter M (μm) of the circumferential coating layer in a column of "M (μm)".

Furthermore, as to the obtained honeycomb structure, there was measured a minimum distance T (mm) from an outermost circumference complete cell to the surface of the circumferential coating layer. Table 1 shows measurement results. Additionally, the measurement of the minimum distance T (mm) was carried out in the inflow end face of the honeycomb structure.

As to the honeycomb structure of Example 1, "strength evaluation" and "oozing-out evaluation of a catalyst" were carried out by the following methods. Table 1 shows the results.

(Strength Evaluation)

First, the prepared honeycomb structure was disposed to be horizontally directed so that the cell extending direction was horizontal. A rod-like member whose end face was a flat surface was pressed vertically from the upside onto the circumferential coating layer of the horizontally disposed honeycomb structure at a rate of 1 mm/sec, thereby carrying out a breakdown test to judge whether or not the circumferential coating layer was damaged. The rod-like member had a round end face having a diameter of 0.2 mm. A load when pressing the rod-like member was set to 100 N. As the rod-like member, a material made of carbon steel S45C was used. In this breakdown test, a case where the circumferential coating layer of the honeycomb structure was not damaged was evaluated as pass, and Table 1 shows "OK" in a column of "the strength evaluation". Furthermore, in this breakdown test, a case where the circumferential coating layer of the honeycomb structure was damaged was evaluated as a failure, and Table 1 shows "NG" in the column of "the strength evaluation".

(Oozing-Out Evaluation of Catalyst)

The catalyst was loaded onto the prepared honeycomb structure by the following method and oozing-out of the catalyst to the surface of the circumferential coating layer was visually confirmed. First, a catalyst slurry including the catalyst to be loaded was prepared. Next, the partition walls of the honeycomb structure were coated with the prepared catalyst slurry. There is not any special restriction on a coating method of the catalyst slurry. An example of a suitable coating method is a method (a suction method) in which in a state where one end face of the honeycomb structure is immersed into the catalyst slurry, the honeycomb structure is sucked from the other end face. In this way, the partition walls of the honeycomb structure was coated with the catalyst slurry, and then the catalyst slurry was dried. Furthermore, the dried catalyst slurry may be fired. In this way, a honeycomb filter was obtained in which the catalyst was loaded onto the partition walls. An amount of the catalyst to be loaded was set to 50 g/liter. The catalyst was loaded in this manner, the surface of the circumferential coating layer was visually observed, and it was confirmed whether or not the catalyst oozed outside. In a case where it was not confirmed that the catalyst oozed out to the surface of the circumferential coating layer, Table 1 shows "none" in a column of "oozing-out evaluation of the catalyst". In a case where it was confirmed that the catalyst oozed out to the surface of the circumferential coating layer, Table 1 shows "present" or "slight present" in the column of "the oozing-out evaluation of the catalyst". Furthermore, in the oozing-out evaluation of the catalyst, even in the case where it was not confirmed that the catalyst oozed out to the surface of the circumferential coating layer, the column additionally shows "(discolored)" when it was confirmed that the circumferential coating layer was discolored. Furthermore, also in the case where it was confirmed that the catalyst slightly oozed out to the surface of the circumferential coating layer, the column additionally shows "(no influence on performance)" when there were not any problems in a performance aspect of the honeycomb structure.

TABLE 1

| | Distance T [mm] | Circumferential coating layer | | | | | Oozing-out |
| | | Porosity P [%] | (100 − P) | 16 × (100 − P)$^{-1.4}$ | Ave. pore dia. M [μm] | Strength evaluation | evaluation of catalyst |
|---|---|---|---|---|---|---|---|
| Example 1 | 1 | 75 | 25 | 0.177 | 20 | OK | None |
| Example 2 | 1 | 70 | 30 | 0.137 | 20 | OK | None |
| Example 3 | 1 | 65 | 35 | 0.110 | 20 | OK | None |
| Example 4 | 1 | 60 | 40 | 0.091 | 20 | OK | None |
| Example 5 | 1 | 30 | 70 | 0.042 | 20 | OK | None |
| Example 6 | 1 | 25 | 75 | 0.038 | 20 | OK | None |
| Example 7 | 1 | 20 | 80 | 0.035 | 20 | OK | None |
| Example 8 | 0.3 | 75 | 25 | 0.177 | 20 | OK | None |
| Example 9 | 0.3 | 70 | 30 | 0.137 | 20 | OK | None |
| Example 10 | 0.3 | 65 | 35 | 0.110 | 20 | OK | None |
| Example 11 | 0.3 | 60 | 40 | 0.091 | 20 | OK | None |
| Example 12 | 0.3 | 30 | 70 | 0.042 | 20 | OK | None |
| Example 13 | 0.3 | 25 | 75 | 0.038 | 20 | OK | None |
| Example 14 | 0.3 | 20 | 80 | 0.035 | 20 | OK | None |
| Example 15 | 0.2 | 75 | 25 | 0.177 | 20 | OK | None |
| Example 16 | 0.2 | 70 | 30 | 0.137 | 20 | OK | None |
| Example 17 | 0.2 | 65 | 35 | 0.110 | 20 | OK | None |
| Example 18 | 0.2 | 60 | 40 | 0.091 | 20 | OK | None |
| Example 19 | 0.2 | 30 | 70 | 0.042 | 20 | OK | None |
| Example 20 | 0.2 | 25 | 75 | 0.038 | 20 | OK | None |
| Example 21 | 0.2 | 20 | 80 | 0.035 | 20 | OK | None |
| Example 22 | 0.15 | 70 | 30 | 0.137 | 20 | OK | None |
| Example 23 | 0.15 | 65 | 35 | 0.110 | 20 | OK | None |
| Example 24 | 0.15 | 60 | 40 | 0.091 | 20 | OK | None |
| Example 25 | 0.15 | 30 | 70 | 0.042 | 20 | OK | None |
| Example 26 | 0.15 | 25 | 75 | 0.038 | 20 | OK | None |
| Example 27 | 0.15 | 20 | 80 | 0.035 | 20 | OK | None |
| Example 28 | 0.1 | 60 | 40 | 0.091 | 20 | OK | None |
| Example 29 | 0.1 | 30 | 70 | 0.042 | 20 | OK | None |
| Example 30 | 0.1 | 25 | 75 | 0.038 | 20 | OK | None |
| Example 31 | 0.1 | 20 | 80 | 0.035 | 20 | OK | None |
| Example 32 | 0.05 | 30 | 70 | 0.042 | 20 | OK | None |
| Example 33 | 0.05 | 25 | 75 | 0.038 | 20 | OK | None |
| Example 34 | 0.05 | 20 | 80 | 0.035 | 20 | OK | None |

Examples 2 to 34

As shown in Table 1, values of "a minimum distance T (mm)" and "a porosity P (%)" were changed, thereby preparing honeycomb structures of Examples 2 to 34. The minimum distance T (mm) was adjusted by changing a thickness of a circumferential coating material to coat. The porosity P (%) was adjusted by changing an amount of a pore former to be added to the circumferential coating material.

Comparative Examples 1 to 15

As shown in Table 2, values of "a minimum distance T (mm)" and "a porosity P (%)" were changed, thereby preparing honeycomb structures of Comparative Examples 1 to 15. The minimum distance T (mm) was adjusted by changing a thickness of a circumferential coating material to coat. The porosity P (%) was adjusted by changing an amount of a pore former to be added to the circumferential coating material.

TABLE 2

| | Distance T [mm] | Circumferential coating layer | | | | | Oozing-out |
| | | Porosity P [%] | (100 − P) | 16 × (100 − P)$^{-1.4}$ | Ave. pore dia. M [μm] | Strength evaluation | evaluation of catalyst |
|---|---|---|---|---|---|---|---|
| Comparative Example 1 | 0.15 | 75 | 25 | 0.177 | 20 | NG | None |
| Comparative Example 2 | 0.1 | 75 | 25 | 0.177 | 20 | NG | None |
| Comparative Example 3 | 0.1 | 70 | 30 | 0.137 | 20 | NG | None |
| Comparative Example 4 | 0.1 | 65 | 35 | 0.110 | 20 | NG | None |
| Comparative Example 5 | 0.05 | 75 | 25 | 0.177 | 20 | NG | None |
| Comparative Example 6 | 0.05 | 70 | 30 | 0.137 | 20 | NG | None |
| Comparative Example 7 | 0.05 | 65 | 35 | 0.110 | 20 | NG | None |
| Comparative Example 8 | 0.05 | 60 | 40 | 0.091 | 20 | NG | None |
| Comparative Example 9 | 0.03 | 75 | 25 | 0.177 | 20 | NG | None |
| Comparative Example 10 | 0.03 | 70 | 30 | 0.137 | 20 | NG | None |
| Comparative Example 11 | 0.03 | 65 | 35 | 0.110 | 20 | NG | None |
| Comparative Example 12 | 0.03 | 60 | 40 | 0.091 | 20 | NG | None |
| Comparative Example 13 | 0.03 | 30 | 70 | 0.042 | 20 | NG | None |
| Comparative Example 14 | 0.03 | 25 | 75 | 0.038 | 20 | NG | None |
| Comparative Example 15 | 0.03 | 20 | 80 | 0.035 | 20 | NG | None |

TABLE 3

| | Circumferential coating layer | | | | | Oozing-out | |
|---|---|---|---|---|---|---|---|
| | Distance T [mm] | Porosity P [%] | (100 − P) | 16 × (100 − P)$^{-1.4}$ | Ave. pore dia. M [μm] | Strength evaluation | evaluation of catalyst |
| Example 35 | 0.05 | 30 | 70 | 0.042 | 20 | OK | None |
| Example 36 | 0.05 | 25 | 75 | 0.038 | 20 | OK | None |
| Example 37 | 0.05 | 20 | 80 | 0.035 | 20 | OK | None |
| Example 38 | 0.05 | 30 | 70 | 0.042 | 30 | OK | None |
| Example 39 | 0.05 | 25 | 75 | 0.038 | 30 | OK | None |
| Example 40 | 0.05 | 20 | 80 | 0.035 | 30 | OK | None |
| Example 41 | 0.05 | 30 | 70 | 0.042 | 40 | OK | None (discolored) |
| Example 42 | 0.05 | 25 | 75 | 0.038 | 40 | OK | None |
| Example 43 | 0.05 | 20 | 80 | 0.035 | 40 | OK | None |
| Example 44 | 0.05 | 30 | 70 | 0.042 | 45 | OK | None (discolored) |
| Example 45 | 0.05 | 25 | 75 | 0.038 | 45 | OK | None (discolored) |
| Example 46 | 0.05 | 20 | 80 | 0.035 | 45 | OK | None |
| Example 47 | 0.05 | 30 | 70 | 0.042 | 50 | OK | Slightly present (no influence on performance) |
| Example 48 | 0.05 | 25 | 75 | 0.038 | 50 | OK | Slightly present (no influence on performance) |
| Example 49 | 0.05 | 20 | 80 | 0.035 | 50 | OK | Slightly present (no influence on performance) |

Examples 35 to 49

As shown in Table 3, values of "a minimum distance T (mm)" and "a porosity P (%)" were changed, thereby preparing honeycomb structures of Examples 35 to 49. The minimum distance T (mm) was adjusted by changing a thickness of a circumferential coating material to coat. The porosity P (%) and an average pore diameter M (μm) were adjusted by changing an amount of a pore former to be added to the circumferential coating material and a grain sizes.

TABLE 4

| | Circumferential coating layer | | | | | |
|---|---|---|---|---|---|---|
| | Distance T [mm] | Porosity P [%] | (100 − P) | 16 × (100 − P)$^{-1.4}$ | Pressure loss change ratio | Judgment |
| Comparative Example 16 | 2.5 | 60 | 40 | 0.091 | 110 | NG |
| Comparative Example 17 | 2 | 60 | 40 | 0.091 | 108 | NG |
| Example 50 | 1.5 | 60 | 40 | 0.091 | 105 | OK |
| Example 51 | 1 | 60 | 40 | 0.091 | 104 | OK |
| Example 52 | 0.8 | 60 | 40 | 0.091 | 103 | OK |
| Example 53 | 0.1 | 60 | 40 | 0.091 | 100 | OK |

Examples 50 to 53 and Comparative Examples 16 and 17

In Examples 50 to 53 and Comparative Examples 16 and 17, as shown in Table 4, values of "a minimum distance T (mm)" and "a porosity P (%)" were changed, thereby preparing honeycomb structures of Examples 50 to 53 and Comparative Examples 16 and 17. Additionally, in Examples 50 to 53 and Comparative Examples 16 and 17, a shape of cells defined by partition walls was changed to a shape in which quadrangular cells and octagonal cells were alternately arranged. Furthermore, a porosity of the partition walls was 41% and an average pore diameter of the partition walls was 15 μm.

As to the honeycomb structures of Examples 50 to 53 and Comparative Examples 16 and 17, "a pressure loss change ratio" was measured by the following method. Table 4 shows the results.

(Pressure Loss Change Ratio)

From an inflow end face side of the honeycomb structure of each of Examples 50 to 53 and Comparative Examples 16 and 17, air at 25° C. was passed at a rate of 10 m$^3$/min and pressure loss of the honeycomb structure was measured. For "the pressure loss change ratio", a pressure loss value of the honeycomb structure of Example 53 was defined as "100" and a ratio of the pressure loss value of the honeycomb structure of each of Examples 50 to 52 and Comparative Examples 16 and 17 was calculated. For example, "the pressure loss change ratio" of the honeycomb structure of Comparative Example 16 indicates "110" and means that the pressure loss increases as much as 10% relative to the pressure loss value of the honeycomb structure of Example 53.

(Results)

As shown in Table 1 to Table 3, all the honeycomb structures of Examples 1 to 49 indicated satisfactory results in strength evaluation. The honeycomb structures of Examples 1 to 49 satisfy Equation (1) and Equation (2) which are hitherto described. On the other hand, in all the honeycomb structures of Comparative Examples 1 to 15, breakdown of a circumferential coating layer was confirmed in the strength evaluation. The honeycomb structures of Comparative Examples 1 to 15 did not satisfy both of Equation (1) and Equation (2). Therefore, it has been found that when the honeycomb structure including the circumferential coating layer satisfies Equation (1) and Equation (2), the circumferential coating layer is hard to be damaged. Furthermore, it has been found that in a range where the honeycomb structure including the circumferential coating layer satisfies Equation (1) and Equation (2), it is possible to further decrease the thickness of the circumferential coating layer. Especially in "the oozing-out evaluation" of each of Examples 41 to 49, it has been confirmed that even in a case of further decreasing the thickness of the circumferential coating layer, there are not any influences on a performance aspect of the honeycomb structure.

Furthermore, as shown in Table 4, it has been found that when the value of the minimum distance T (mm) is 1.5 mm or less, a pressure loss change ratio is 5% or less relative to the honeycomb structure in which the thickness of the circumferential coating layer further decreases. Consequently, in the honeycomb structure satisfying Equation (1) and Equation (2) which are described above, the thickness of the circumferential coating layer does not excessively increase and it is possible to effectively inhibit increase of pressure loss.

A honeycomb structure of the present invention is utilizable as a catalyst carrier onto which a catalyst is loaded to purify an exhaust gas emitted from a gasoline engine, a diesel engine or the like or a filter to purify the exhaust gas.

DESCRIPTION OF REFERENCE NUMERALS

1: partition wall, 2: cell, 2a: inflow cell, 2b: outflow cell, 2x: cell (the cell formed at an outermost circumference and an outermost circumference complete cell), 2y: cell (the cell formed at the outermost circumference and an outermost circumference incomplete cell), 2z: cell (a cell other than the cell formed at the outermost circumference and a complete cell), 3: circumferential coating layer, 4: honeycomb structure body, 5: plugging portion, 7: circumferential wall, 11: inflow end face, 12: outflow end face, 20: honeycomb segment, 21: partition wall, 22: cell, 22a: inflow ell, 22b: outflow cell, 23: circumferential coating layer, 24: honeycomb structure body, 25: plugging portion, 27: bonding layer, 31: inflow end face, 32: outflow end face, 100, 100A, 200 and 300: honeycomb structure, T: minimum distance (the minimum distance from the outermost circumference complete cell to the surface of the circumferential coating layer), and U1 and U2: distance.

What is claimed is:

1. A honeycomb structure comprising:
a pillar-shaped honeycomb structure body having porous partition walls defining a plurality of cells extending from an inflow end face to an outflow end face to become through channels for fluid; and
a circumferential coating layer formed separately from the porous partition walls and disposed to surround a circumference of the honeycomb structure body, so as to form an interface between the circumferential coating layer and the circumference of the honeycomb structure body,
wherein the cells which are formed at an outermost circumference of the honeycomb structure body and in which peripheries of the cells are defined by the partition walls without any lacks and the circumferential coating layer does not penetrate inner portions of the cells are defined as outermost circumference complete cells,
in a cross section of the honeycomb structure body which is perpendicular to an extending direction of the cells, a smallest distance T (mm) among distances from the outermost circumference complete cells to the surface of the circumferential coating layer and a porosity P (%) of the circumferential coating layer satisfy relations of Equation (1) and Equation (2) as follows:

$$1.5 \geq T \geq 16 \times (100-P)^{-1.4}; \text{ and} \quad \text{Equation (1):}$$

$$20 \leq P \leq 75, \text{ and} \quad \text{Equation (2):}$$

in a cross section of the circumferential coating layer, a total area Sp (µm²) of pores formed in the circumferential coating layer and a total peripheral length Lp (µm) of the pores formed in the circumferential coating layer further satisfy a relation of Equation (4) as follows:

$$4 \times Sp/Lp \leq 45 \quad \text{Equation (4).}$$

2. The honeycomb structure according to claim 1,
wherein the smallest distance T (mm) among the distances from the outermost circumference complete cells to the surface of the circumferential coating layer further satisfies a relation of Equation (3) as follows:

$$T \geq 0.038 \quad \text{Equation (3).}$$

3. The honeycomb structure according to claim 1,
wherein a material of the circumferential coating layer includes at least one selected from a first material group consisting of silicon carbide, cordierite, a silicon-silicon carbide based composite material, silicon nitride, mullite, alumina, a silicon carbide-cordierite based composite material, and aluminum titanate.

4. The honeycomb structure according to claim 3,
wherein the material of the circumferential coating layer contains 20 mass % or more of at least one selected from the first material group.

5. The honeycomb structure according to claim 1,
wherein a material of the honeycomb structure body includes at least one selected from a second material group consisting of silicon carbide, cordierite, a silicon-silicon carbide based composite material, silicon nitride, mullite, alumina, a silicon carbide-cordierite based composite material, and aluminum titanate.

6. The honeycomb structure according to claim 5,
wherein the material of the honeycomb structure body contains 30 mass % or more of at least one selected from the second material group.

7. The honeycomb structure according to claim 1, further comprising:
plugging portions disposed in an end portion on the inflow end face side of parts of the cells formed in the honeycomb structure body and an end portion on the outflow end face side of residual cells among the cells.

8. The honeycomb structure according to claim 1,
wherein a thickness of the partition walls is from 0.05 to 0.5 mm.

9. The honeycomb structure according to claim 1,
wherein a porosity of the partition walls is from 20 to 75%.

10. The honeycomb structure according to claim 1,
wherein a cell density of the honeycomb structure body is from 15 to 200 cells/cm².

11. The honeycomb structure according to claim 1,
wherein the honeycomb structure body has a circumferential wall disposed to surround the partition walls.

12. The honeycomb structure according to claim 1,
wherein in the smallest distance T (mm) among the distances from the outermost circumference complete cells to the surface of the circumferential coating layer, a thickness t2 (mm) in a range where the circumferential coating layer is disposed is from 0.025 to 1.0 mm.

* * * * *